United States Patent [19]

Schirer

[11] 4,024,970

[45] May 24, 1977

[54] BALE HANDLING APPARATUS

[75] Inventor: David K. Schirer, West Bend, Wis.

[73] Assignee: Gehl Company, West Bend, Wis.

[22] Filed: Nov. 26, 1975

[21] Appl. No.: 635,686

[52] U.S. Cl. .......................... 214/147 G; 214/653; 242/86.5 R

[51] Int. Cl.² .......................................... B66C 1/44

[58] Field of Search ....... 214/147 R, 147 G, 650 R, 214/77 R, 653; 294/88, 61, 106; 242/86.6, 86.5 R

[56] References Cited

UNITED STATES PATENTS

| | | | |
|---|---|---|---|
| 3,038,620 | 6/1962 | Collin | 214/147 G |
| 3,734,304 | 5/1973 | Cabaniss | 214/147 G X |
| 3,880,305 | 4/1975 | Van Polen | 214/147 G |
| 3,888,317 | 6/1975 | Walters | 214/147 G X |
| 3,908,846 | 9/1975 | Brummitt | 214/147 G |

Primary Examiner—Frank E. Werner
Attorney, Agent, or Firm—James E. Nilles

[57] ABSTRACT

A bale handling apparatus for use with a vehicle such as a farm tractor for lifting and conveying large bales of cut crop material such as hay or the like. The bale handling apparatus includes a vertically mounted frame supported by the tractor, a pair of gripping arms engageable with opposite sides of a bale and a support structure for pivotably mounting the gripping arms such that the arms engaging the bale can pivot toward and away from each other to clampingly engage the bale and can move vertically to lift the bale. The gripping arms each have a generally L-shaped configuration and have one end for engaging the bale and the other end including a gear sector attached thereto. The arms are each pivotably mounted to the support structure such that their respective gear sectors are received in intermeshing relationship and in such a manner that pivotal movement of one of the arms causes pivotal movement of the other.

7 Claims, 4 Drawing Figures

BALE HANDLING APPARATUS

BACKGROUND OF THE INVENTION

The present invention relates to bale handling apparatus which are mounted on farm vehicles such as tractors or the like and which are used for gripping large bales of cut crop material and for transporting, lifting, stacking and unrolling of such bales.

Several prior art bale handling machines have previously been developed for conveying and lifting large bales of hay and the like. See, for example, U.S. Pat. Nos. 3,880,305 to Van Polen, issued Apr. 29, 1975 and 3,908,846 to Brummit, issued Sept. 30, 1975. None of the prior art machines, however, have presented a completely satisfactory means for handling bales which provides both adequate control over the bale as well as facilitates sufficient vertical movement of the bale. As shown in the patents cited above, the bale handling machines commonly employed include a pair of arms which are engagable against opposite sides of a bale in order to grip the bale for conveying and lifting. One drawback inherent in such prior art apparatus is that the gripping arm assemblies do not sufficiently restrict parallel movement of the arms. When, for example, the tractor and baling machine are used on a hillside, due to the substantial weight of the bales, the bale and the gripping arms tend to swing laterally with respect to the axis of the tractor. A further disadvantage of such prior art machines is that the means employed for supporting the gripping arms does not provide a satisfactory range of vertical movement of the bale.

SUMMARY OF THE INVENTION

The present invention provides an improved bale handling means including a pair of gripping arms which can be controlled regardless of the relative orientation of the tractor, whether it is positioned on a hillside or upon level terrain, and also including means facilitating increased vertical movement of the bale.

More specifically, the apparatus of the invention includes a vertically positioned frame structure which can be mounted to the rear of a farm tractor by a conventional three-point hitch, a pair of gripping arms which are movable into clamping engagement with opposite sides of a bale, and a gripping arm support structure which supports the arms for pivotal movement with respect to each other such that they can engage a bale and which also supports the arms for pivotal movement about a horizontal axis such that the bales can be raised or lowered. The support structure is comprised of a rock shaft rotatably mounted to an upper portion of the vertically positioned frame and a pair of arm support beams which are rigidly connected to the rock shaft for pivotal movement therewith and for supporting the gripping arms.

The gripping arms of the invention are generally L-shaped tubular members each including bale engaging claws at one end and gear sectors at their other end. The arms are pivotably mounted to the arm support beams at a point intermediate their ends and in such a manner that the gear sectors are received in mutually intermeshing relationship. Movement of one of the arms is thus transmitted through the gear sectors to cause a simultaneous and equivalent movement of the other arms. The bale engaging claws at the ends of the arms are generally rotatably mounted to permit rotation of the bale.

The bale handling apparatus also includes a fluid motor operably connected between the support structure and the frame for causing pivotal movement of the support structure about a horizontal axis and for causing a consequent vertical movement of the bale engaging ends of the gripping arms thereby permitting lifting of the bale. A second fluid motor is also provided to connect one of the arms to the support structure whereby activation of the fluid motor can cause pivotal movement of the arms to engage or release a bale located therebetween.

The particular structure of the gripping arms of the present invention including the gear sector arrangement for causing simultaneous movement of the arms results in a plurality of advantages. Whereas the prior art bale handling machines were unstable on hillsides due to their tendency to swing to a position laterally of the center line of the machine, the gripping arms of the invention are restricted against such movement by the gear sector assembly arrangement and by the arm mounting means.

The bale handling machine of the invention can also be used to pick-up bales of any variety of sizes whereas the prior art apparatus, which employed for example bell crank mechanisms in order to provide gripping movement of the arms, have a limited range of gripping positions and are generally useful only to engage bales of specified sizes.

The present invention is a further improvement over any of the prior art bale handling means in that the support structure for the gripping arms, disposed between the frame and the arms, is pivotably mounted for movement about a horizontal axis and permits substantial vertical movement of the ends of the arms and of a bale held therebetween. Furthermore, the arms may be positioned relatively close to the ground for gripping small bales or for use in unrolling bales. The increased vertical movement of the arms also permits bales to be lifted sufficiently that they may be placed upon loading platforms or vehicles or lifted over fences.

The apparatus of the invention also provides a relatively uncomplicated design compared with the prior art machines and is thus less expensive to manufacture and less burdensome to maintain. Furthermore, the design of the invention permits the use of fluid cylinders which are of standard size.

The following description of a preferred embodiment merely describes a particular embodiment of the present invention and should not be viewed as limiting the scope of the invention in a manner inconsistent with that defined by the claims.

DESCRIPTION OF A PREFERRED EMBODIMENT

Figures 1, 2:
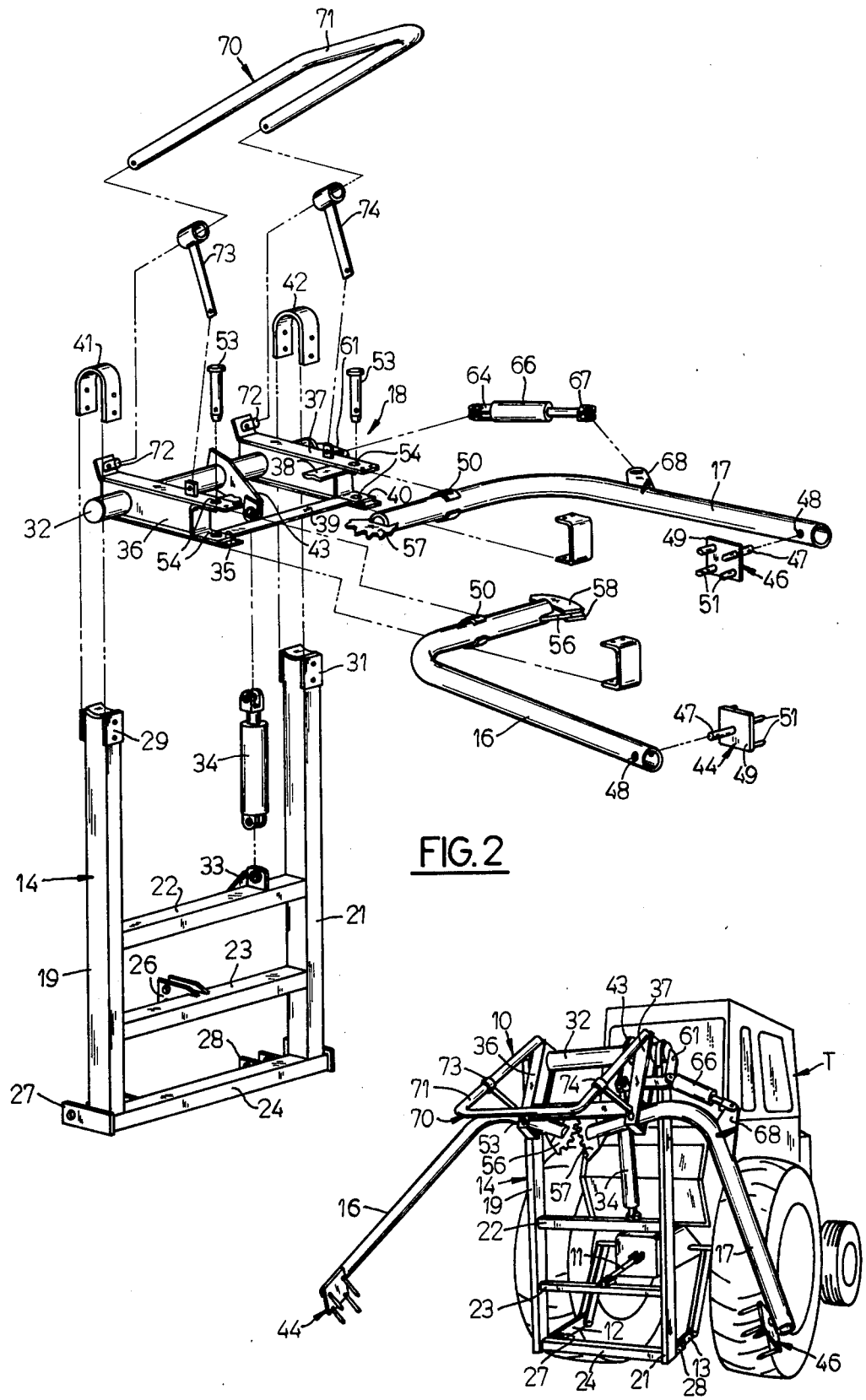
FIG. 1 is an isometric view showing the bale handling apparatus of the present invention attached to the rear of a farm tractor.
FIG. 2 is an exploded isometric view of the bale handling apparatus shown in FIG. 1.

FIG. 1 illustrates a bale handling apparatus 10 of the invention mounted on the rear of a farm tractor T by a conventional three-point hitch including linkages 11, 12 and 13. Generally the bale handling apparatus comprises a vertically extending frame assembly 14, a pair of gripping arms 16 and 17 and an arm support structure assembly 18.

The frame assembly 14 is more clearly shown in FIG. 2 and is comprised of a pair of generally vertically extending braces 19 and 21 supported in parallel spaced apart relationship by a pair of horizontally extending braces 22 and 23, and by a horizontally extending frame base 24. The frame includes three mounting brackets 26, 27 and 28 rigidly secured to the horizontal brace 23 and the frame base 24, and positioned to receive the linkages of the three-point hitch. The upper ends of braces 19 and 21 are capped by tube support brackets 29 and 31 respectively. Each of the tube support brackets 29 and 31 has a concave upper surface for rotatably supporting opposite ends of a rock shaft 32 of the arm support assembly 18. The horizontally extending brace 22 also includes a cylinder anchor 33 rigidly attached thereto to pivotably support the lower end of a fluid motor 34.

The arm support structure assembly 18 is generally comprised of the horizontally extending rock shaft 32, previously referred to, and a pair of arm supporting beams 36 and 37. The beams 36 and 37 are welded or otherwise rigidly secured to the rock shaft 32 such that rotation of the rock shaft will cause a pivotal movement of the beams around the generally horizontally extending axis of the rock shaft. A pair of beam braces 38 and 39 are secured to the ends of the beams 36 and 37 to maintain proper spacing of these ends of the beams and to provide structural support.

Figure 4:
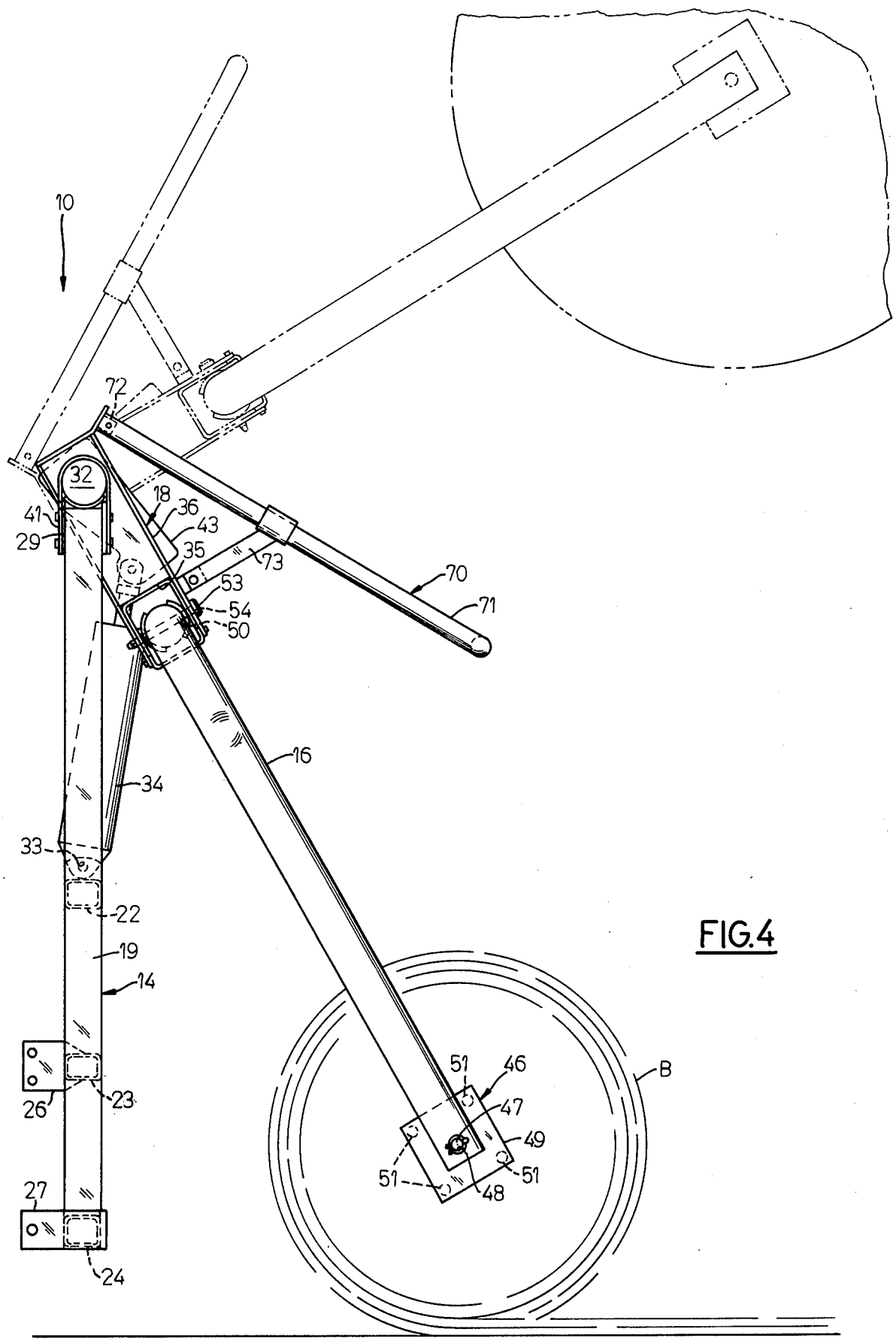
FIG. 4 is a side elevation view of the bale handling apparatus shown in FIG. 3 and showing varied positions of the gripping arms.

The rock shaft 32 is rotatably supported on the tube support brackets 29 and 31 and clamped thereon by a pair of bearing straps 41 and 42 respectively. The bearing straps 41 and 42 are specifically fitted so that they will prevent displacement of the ends of the rock shaft from the concave surface of the brackets 29 and 31 but will not restrict rotation of the rock shaft. The rock shaft is also provided with a lever arm 43 rigidly secured thereto and positioned between the beams 36 and 37. The end of the lever arm opposite the rock shaft 32 is pivotably connected to a clevis attached to the piston end of the fluid motor 34 by a pivot pin extending therethrough. Actuation of the fluid motor 34 will result in rotation of the rock shaft 32 and pivotal movement of the beams 36 and 37, as shown in FIG. 4.

The gripping arms 16 and 17 are comprised of generally L-shaped tubular members which are independently pivotably mounted within the respective clevises 35 and 40 located in the ends of the beams 36 and 37. The L-shaped tubular members are comprised of elongated portions which extend outwardly from the arm support assembly 18 for supporting a pair of rotatable gripping claws 44 and 46 at their outer ends. The arms also include perpendicularly extending portions which are received in the clevises 35 and 40 and which include gear sectors 56 and 57 rigidly secured within slots in their ends. The arms 16 and 17 are pivotably mounted to the beams 36 and 37 by pivot pins 53 which extend through bores 54 in the clevises 35 and 40 and which are receivable within generally vertically extending bores 50 located intermediate the perpendicularly extending portions of the gripping arms. The gear sectors 56 and 57 comprise generally flat plates and each include a plurality of teeth which are mutually engagable and intermeshing in such a manner that pivotal movement of either of the arms 16 and 17 about the pivot pins 53 will result in pivotal movement of the other arm about its pivot pin 53. The gear sectors 56 and 57 are maintained in accurate planar alignment with respect to each other by a pair of aligning plates 58 which are disposed in parallel relationship to the gear sectors and which are secured to opposite sides of the plate 56 such that they receive a portion of the gear sector 57 therebetween. The rotatable gripping claws 44 and 46, previously referred to, are pivotably mounted to the outer ends of the arms 16 and 17 respectively by a rotatable shaft 47 which is received within a generally horizontally extending bore 48 in the ends of the arms. The claws 44 and 46 include generally flat square plates 49 each supporting a plurality of sharpened tines 51 which are designed to be received in the bale to provide a gripping engagement.

Figure 3:
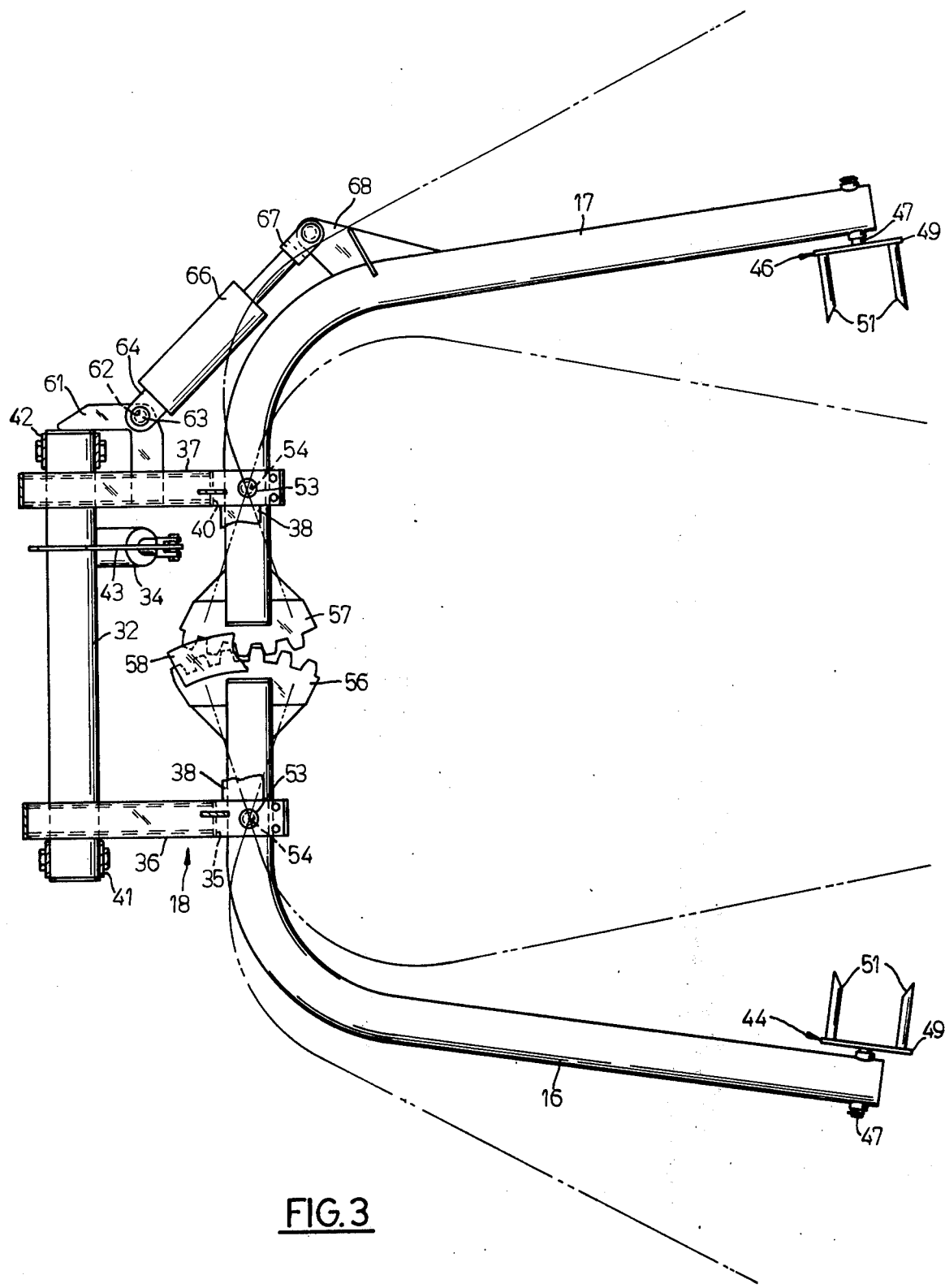
FIG. 3 is a plan view of the bale handling apparatus with portions removed in the interest of clarity.

The means for causing gripping movement of the gripping arms 16 and 17 is best shown in FIG. 3. An angular plate 61, which is rigidly secured to the beam 37 and rock shaft 32 extends outwardly therefrom and includes a bore 62 for receiving a pivot pin 63 extending through the clevis 64 of a fluid motor 66. The opposite end of the fluid motor is provided with a second clevis 67 which can be pivotably connected to a motor connecting bracket 68 welded or otherwise rigidly secured to the arm 17 at a point intermediate its length. It will be readily apparent that actuation of the fluid motor 66 will cause pivotal movement of the arm 17 about its pivot pin 53 such that the arm can assume any of the various positions shown, for example, by the dashed lines. As previously stated, such movement of the gripping arms 17 will be transmitted to the arm 16 through the gear sectors 56 and 57.

Operation

In order to lift and convey a bale using the bale handling assembly of the present invention, a bale resting on the ground should be approached with the bale gripping arms 16 and 17 generally in the position shown in FIG. 1. The vertical position of the ends of the bale gripping arms or of the claws 44 and 46 can be adjusted by actuation of the fluid motor 34 to cause pivotal movement of the rock shaft 32 and consequently of the beams 36 and 37 and of the bale gripping arms 16 and 17 attached thereto. When the claws 44 and 46 are aligned generally with the center of the bale, the fluid motor 66 may then be extended to cause the claws 44 and 46 to move toward each other into gripping engagement with the sides or ends of the bale. Fluid motor 34 may then be extended to cause the arms 16 and 17 to lift the bale such that it can be transported.

Since the bale handling mechanism of the invention is capable of lifting a bale to a substantial height such as that shown in the phantom lines in FIG. 4, it is necessary to provide means to protect the tractor operator from the possibility that the bale might fall. A bale guard assembly 70 is provided for this purpose. The bale guard assembly 70 comprises a generally U-shaped tubular guard 71 which is received on pins 72 supported by the beams 36 and 37 such that it extends above and projects upwardly from the arm support assembly. The guard 71 is also supported by a pair of upwardly extending brackets 73 and 74 which are secured to the upper surface of the beams 36 and 37.

When a bale is positioned on the ground and received between the gripping claws 44 and 46, since the claws 44 and 46 are rotatably mounted, the tractor T can be driven forward pulling the bale along the ground thereby causing it to unroll. If it is necessary to apply downward force to the bale in order to cause it to unroll, the fluid motor 34 can be contracted to apply a downward torque on the arms 16 and 17 thereby causing the claws 44 and 46 to apply a downward force on the bale.

Resume

The bale handling apparatus of the invention thus presents a gripping arm assembly which provides control over the bale received between the gripping arms regardless of the relative position of the bale handling machine. The gripping arms are also functional to grasp bales of relatively small size as well as larger bales. The machine of the invention also facilitates a greater degree of vertical movement of the bale in order to permit uses of the baling machine which are not feasible with prior art apparatus. The mechanisms of the machine are also relatively uncomplicated and consequently the apparatus is generally less expensive to manufacture and less costly to maintain.

I claim:

1. A bale handling apparatus for gripping bales of cut crop material, said bale handling apparatus comprising:
a frame securable to a supporting vehicle;
an arm support structure means swingably mounted on said frame and swingably movable about a horizontal, transverse axis, said arm support structure means including a shaft supported by said frame and rotatable about said horizontal transverse axes and at least one arm support member extending from said shaft and rigidly secured thereto, said member having a free end portion swingably movable in response to rotational movement of said shaft;
a pair of L-shaped bale gripping arms, each of said arms including a first elongated portion projecting away from said support means and having a free end for engaging a bale and including a second elongated portion generally perpendicular to said first elongated portion and having an end supporting a gear means, said gripping arms each being pivotably supported by said free end portion and being pivotable about spaced apart axes which are generally normal to said horizontal transverse axis and spaced therefrom, each of said arms having bale engaging members at said free end, and said gear means of said arms being in intermeshing relationship whereby transverse movement of one of said arms causes transverse movement of the other of said arms and whereby said free ends are transversely positionable relatively toward and away from one another.

2. The bale handling apparatus set forth in claim 1 wherein said gear means comprise generally flat gear sectors having a plurality of gear teeth, said gear sectors being rigidly secured to said arms.

3. The bale handling apparatus set forth in claim 1 further including power means for causing movement of said arms whereby said arms are operable to grip bales and to move said bales vertically, said power means including a first motor means for causing swinging movement of said support structure about said horizontal, transverse axis whereby a bale gripped by said arms may be moved vertically, and second motor means operably connected to at least one of said arms for causing pivotal movement of said arms with respect to said support structure whereby said arms may grip a bale therebetween.

4. The bale handling apparatus set forth in claim 3 wherein said first motor means is operably connected between said support structure and said frame and wherein said second motor means is operably connected between said support structure and said one of said arms.

5. The bale handling apparatus set forth in claim 3 wherein said frame includes a pair of generally vertically extending braces, said braces rotatably supporting opposite ends of said shaft.

6. The bale handling apparatus set forth in claim 1 wherein said support member comprises an arm support beam extending from said shaft and rigidly secured thereto for swinging movement in response to rotational movement of said shaft, said beam pivotably supporting one of said arms for pivotal movement.

7. A bale handling apparatus for gripping bales of cut crop material, said bale handling apparatus comprising: a generally vertically extending frame; arm support structure means swingably mounted on said frame and swingably movable about a horizontal, transverse axis; a pair of bale gripping arms each having a free end, said arms being mounted for pivotably swinging in a transverse direction on said support structure and about axes which are generally normal to said transverse axis whereby said free ends are transversely positionable toward and away from one another and engagable with a bale, each of said arms having bale engaging members at said free end and gear means at their other end, the gear means of said arms being in intermeshing relationship whereby transverse movement of one of said arms causes transverse movement of the other of said arms; said support structure means including a generally horizontally extending shaft pivotably supported by said frame and rotatable about said horizontal, transverse axis and arm support beams extending from said shaft and rigidly secured thereto for swinging movement upon rotation of said shaft, each of said beams pivotably supporting one of said arms and; power means for causing pivotal movement of said arms whereby said arms are operable to grip bales and to move said bales vertically, said power means including a first motor means operably connected between said support structure and said frame for causing swinging movement of said support structure about a horizontal axis whereby a bale gripped by said arms is moved vertically, and second motor means operably connected between said support structure and at least one of said arms for causing transverse movement of said arms whereby said arms may grip a bale therebetween.

* * * * *